United States Patent Office 3,499,029
Patented Mar. 3, 1970

3,499,029
PROCESS FOR THE MANUFACTURE OF SORBIC ACID
Hans Fernholz, Bad Soden, Taunus, and Hermann Neu, Neu-Isenburg, Germany, assignors to Farbwerke Hoechst Aktiengesellschaft vormals Meister Lucius & Bruning, Frankfurt am Main, Germany, a corporation of Germany
No Drawing. Filed Jan. 28, 1965, Ser. No. 428,865
Claims priority, application Germany, Feb. 1, 1964, F 41,903
Int. Cl. C07c 57/10
U.S. Cl. 260—526
3 Claims

ABSTRACT OF THE DISCLOSURE

A process for preparing sorbic acid by reacting ketene with crotonaldehyde in an inert solvent and in the presence of a catalyst to form a polyester, thermally splitting the polyester at a temperature within the range 150° to 300° C., distilling the thus formed sorbic acid together with at least a portion of the solvent and separating sorbic acid from the distillate by crystallization, the process being characterized by the fact that the mother liquor from the sorbic acid crystallization is used as the solvent in the first step of the process.

The present invention provides a process for preparing sorbic acid from ketene and crotonaldehyde. U.S. Patent 3,021,365 provides a process for the manufacture of sorbic acid wherein the polyester which has been prepared by reacting ketene with crotonaldehyde at a temperature of at least about 25° C. in the presence of an inert solvent and a catalytic amount of a fatty acid salt of a bivalent metal of subgroups V to VIII of the Periodic Table, is mixed with a substance which is suitable as a solvent or diluent and which under normal pressure boils at a temperature above 150° C., preferably above 180° C., and the resulting mixture is subjected to a thermal decomposition at a temperature within the range of 150° to 300° C., preferably to 270° C. in the presence of an alkaline catalyst. A preferred mode of carrying out the above process consists in combining the thermal decomposition of the polyester and the distillation of the sorbic acid that has formed into one stage, so that the distillation product obtained is a mixture consisting predominantly of sorbic acid and diluent. The sorbic acid which crystallizes out when the distillation product is cooled is separated and the solvent or diluent which is recovered as mother liquor and which predominantly contains dissolved sorbic acid and dissolved hexadiene acids which are isomers of sobric acid and which form as by-products, is subjected again to the polyester thermolysis, that is to say, it is recycled.

It has now been found that the aforesaid reaction of ketene with crotonaldehyde which results in the formation of the polyester has the same good result when instead of the inert solvent a solution of sorbic acid and/or another hexadiene acid in a solvent that is inert towards ketene and crotonaldehyde is used as the reaction medium. In this process the acids remain practically unchanged when ketene and crotonaldehyde are used in amounts that are approximately stoichiometrical, the use of a small excess of crotonaldehyde being advantageous. This result is very surprising, for it is known that in general carboxylic acids react with ketene just as well as carbonyl compounds. The importance of this observation resides in the fact that the above-mentioned process for preparing sorbic acid which is based on the thermolysis of the polyester can be simplified very much when the distillation product which is obtained after the removal of the sorbic acid that has crystallized out and which still contains acid is used as the reaction medium for the reaction of ketene with crotonaldehyde whereby some stages, for example the removal of the solvent by distillation after the reaction of ketene with crotonaldehyde and the mixing of the polyester which is obtained as a residue in the said reaction with a diluent that is suitable for use in the thermolysis, can be dispensed with. To sum up, in the process according to the invention the reaction of ketene with crotonaldehyde and the thermal decomposition of the polyester are carried out in the same solvent or diluent, which after the distillation and separation of the sorbic acid that has crystallized out from the distillation product is recycled.

As solvents or diluents there may be used in principle all the substances or classes of substances mentioned in the patent cited above, provided that under normal pressure they boil at a temperature above 150° C. and suitably below 300° C., advantageously at a temperature within the range of 180 to 270° C., and that they are liquid under normal conditions and inert towards ketene and crotonaldehyde. It is advantageous to use aliphatic, alicyclic or aromatic hydrocarbons, for example, petroleum fractions, dodecane, tetradecane, 5-methyl dodecane, dodecene, dicyclohexyl, 1-methyl naphthalene, 2-methyl naphthalene, 1-ethylnaphthalene, tetrahydronaphthalene and ethers, especially the ethers of glycols or polyglycols, for example, triethylene glycol diethyl ether or diethylene glycol dibutyl ether.

The reaction of the ketene with crotonaldehyde is carried out under the conditions indicated in the abovementioned patent, that is, at a temperature within the range of 20 to 50° C. in the presence of 0.1 to 5%, calculated on the quantity by weight of the crotonaldehyde used, of a metal salt of a fatty acid, for example, zinc isobutyrate or zinc stearate. In general, ketene and crotonaldehyde are reacted in approximately stoichiometrical quantities, but advantageously crotonaldehyde is used in an excess of up to 15% by weight. If any unreacted or excess crotonaldehyde should be present it is suitable to distill it off before the thermolysis of the polyester. The thermal decomposition of the polyester is carried out under the conditions described in the above-mentioned patent, the solution of the polyester being advantageously distilled in the presence of an alkaline catalyst under a pressure within the range of 5 to 30 mm. Hg. After separation of the sorbic acid that has crystallized out during the cooling operation the solvent or diluent which is recovered as mother liquor and which still contains acid is again subjected to the process which begins with the reaction of the ketene with crotonaldehyde.

The following examples serve to illustrate the invention but they are not intended to limit it thereto.

EXAMPLE 1

420 grams of ketene were introduced at a temperature within the range of 25° to 38° C. into a mixture of 800 grams of crotonaldehyde, 1200 grams of a petroleum fraction boiling between 220° and 250° C. and containing about 5% by weight of hexadiene acids, and 10 grams of zinc isobutyrate, the mixture being kept mechanically stirred or in another manner agitated. The unreacted crotonaldehyde (160 grams) was removed in vacuo at a temperature within the range of 80° to 100° C. After the addition of 20 grams of caustic soda the mixture was heated for 15 minutes to a temperature within the range of 170° to 180° C. Then another 3000 grams of the above-mentioned petroleum fraction were added and the mixture was distilled at the aforesaid temperature under an appropriate reduced pressure. The distillate gave 890 grams of sorbic acid which after having been sucked off, washed wtih petroleum ether and dried melted at 133° to 134° C. The acid-containing filtrate was subjected to the same procedure as often as desired, whereupon sorbic acid was obtained in an average yield of about 90%.

EXAMPLE 2

420 grams of ketene were introduced at a temperature within the range of 35° to 45° C. into a mechanically stirred mixture of 760 grams of crotonaldehyde, 16 grams of zinc isovalerate and 3000 grams of a solution of 6% strength of sorbic acid in diethyl triethylene glycol. The excess of crotonaldehyde which amounted to about 60 grams was removed in vacuo. The polyester solution obtained was distilled under a presure of 10 to 15 mm. of Hg after the addition of 40 grams of potassium carbonate. The distillate was cooled to 0° C. whereupon 880 grams of sorbic acid were obtained which after having been washed with water, sucked off and dried melted at 134° C. The filtrate which contained from 8 to 10% of sorbic acid and other hexadiene acids was used for a new reaction of ketene and crotonaldehyde. Although the acid content of the filtrate amounts to about 20% after the process had been repeated for 15 times the triethylene glycol diethyl ether could still be used without decreasing the yield of sorbic acid. The same results were obtained when dibutyl diethylene glycol was used.

We claim:

1. A process for preparing sorbic acid which comprises reacting ketene with at least an approximately stoichiometrical amount of crotonaldehyde at a temperature of at least 25° C. in a solvent which is inert to ketene and crotonaldehyde and which under normal pressure boils at a temperature above 150° C., in the presence of a catalytic amount of a fatty acid salt of a bivalent metal of subgroups V to VIII of the Periodic Table to form a reaction mixture containing a polyester, distilling off any unreacted crotonaldehyde that may be present in the reaction mixture, thermally splitting said polyester at a temperature within the range 150° to 300° C. to form a mixture of hexadienoic acids including sorbic acid, distilling the thus formed hexadienoic acid mixture together with at least a portion of said solvent, separating sorbic acid from the distillate by crystallization, and recycling the mother liquor from the sorbic acid crystallization as the solvent in the first step of the process.

2. A process as claimed in claim 1, wherein ketene and crotonaldehyde are used in approximately stoichiometrical amounts.

3. A process as claimed in claim 1, wherein the crotonaldehyde is used in an excess of up to 15% by weight, calculated on the ketene.

References Cited

UNITED STATES PATENTS 3,021,365   2/1962   Fernholz et al. _____ 260—526

JAMES A. PATTEN, Primary Examiner